May 28, 1957 W. A. FINK 2,793,849
WEIGHING SCALES
Filed Sept. 23, 1950 8 Sheets-Sheet 1
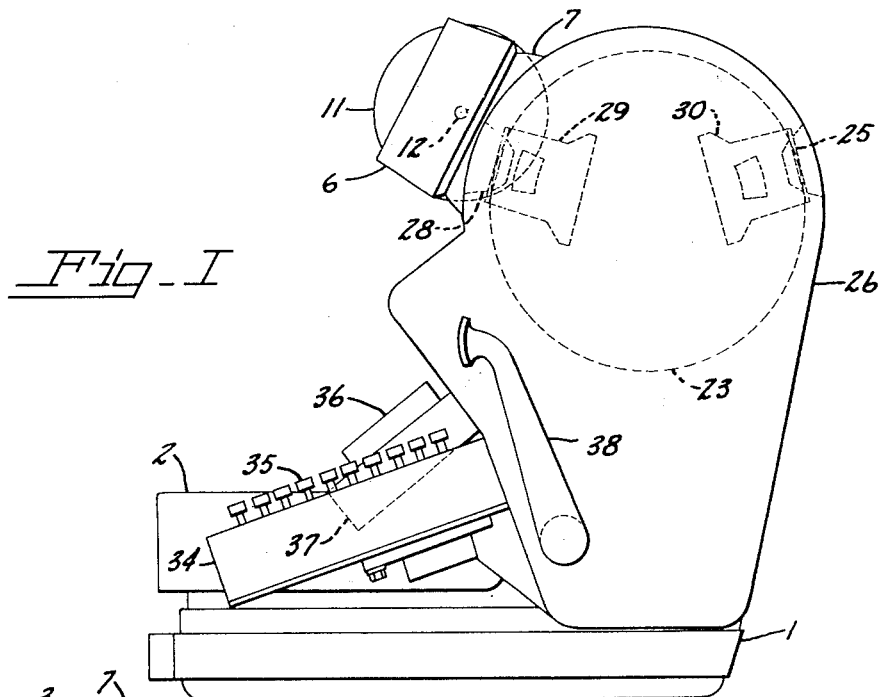
Fig. I
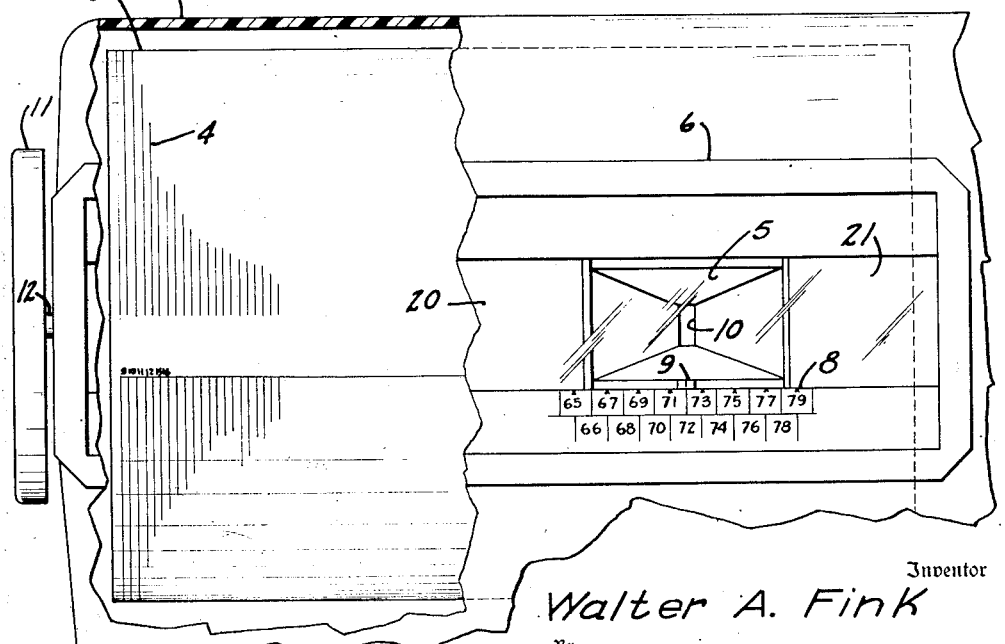
Fig. III
Inventor
Walter A. Fink
By Marshall & Marshall
Attorneys

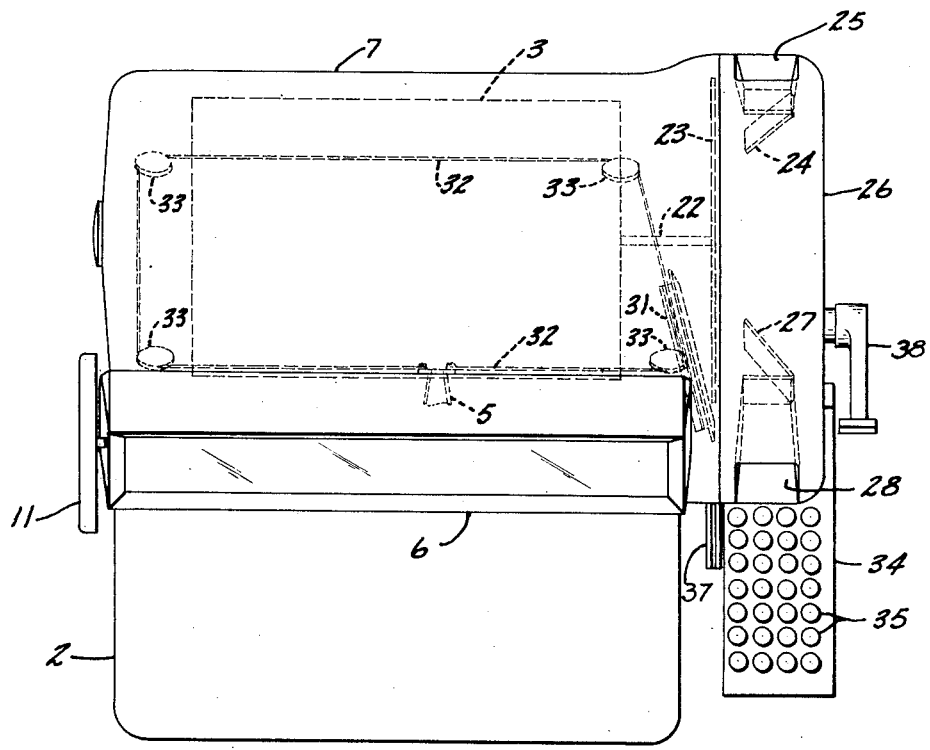
Fig. II
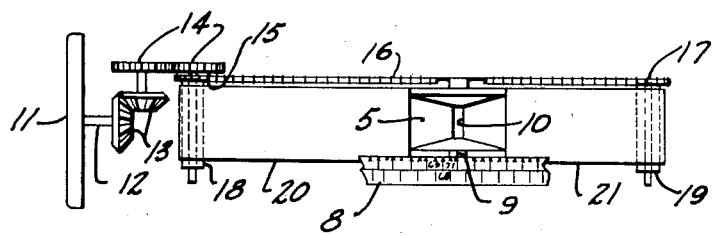
Fig. IV

May 28, 1957 W. A. FINK 2,793,849
WEIGHING SCALES
Filed Sept. 23, 1950 8 Sheets-Sheet 3
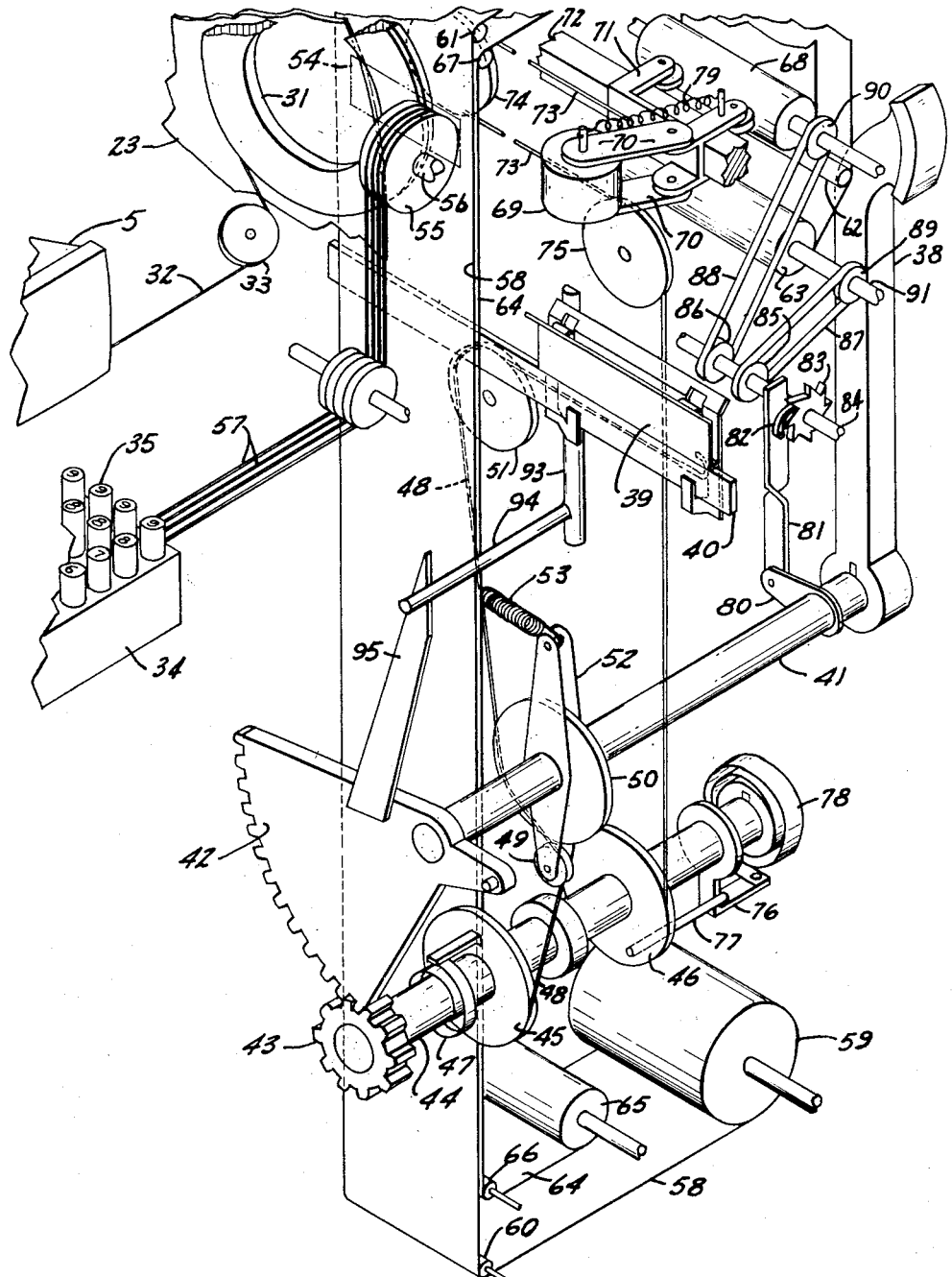
Fig. V
Inventor
Walter A. Fink
By Marshall & Marshall
Attorneys

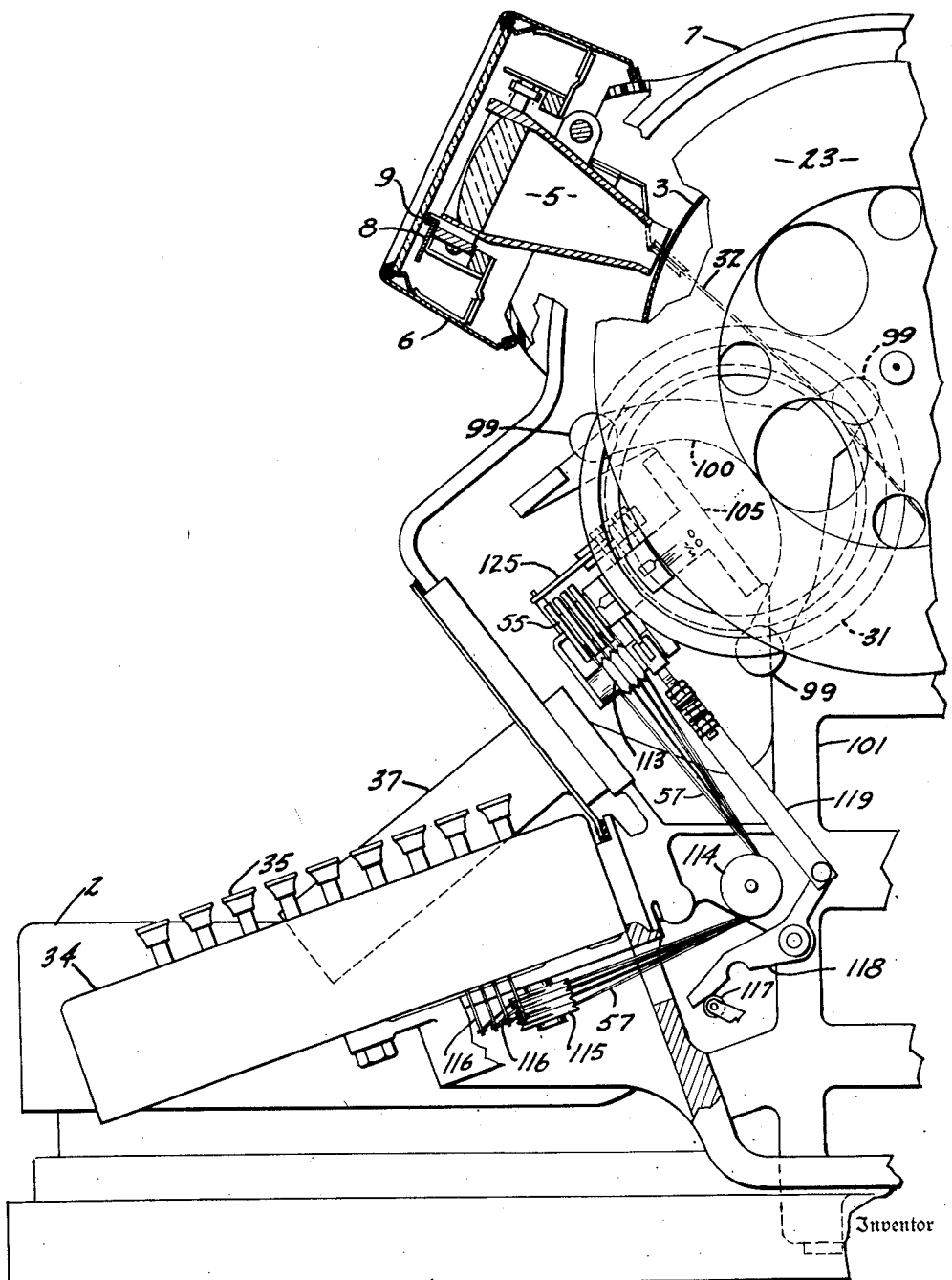
Fig. VI

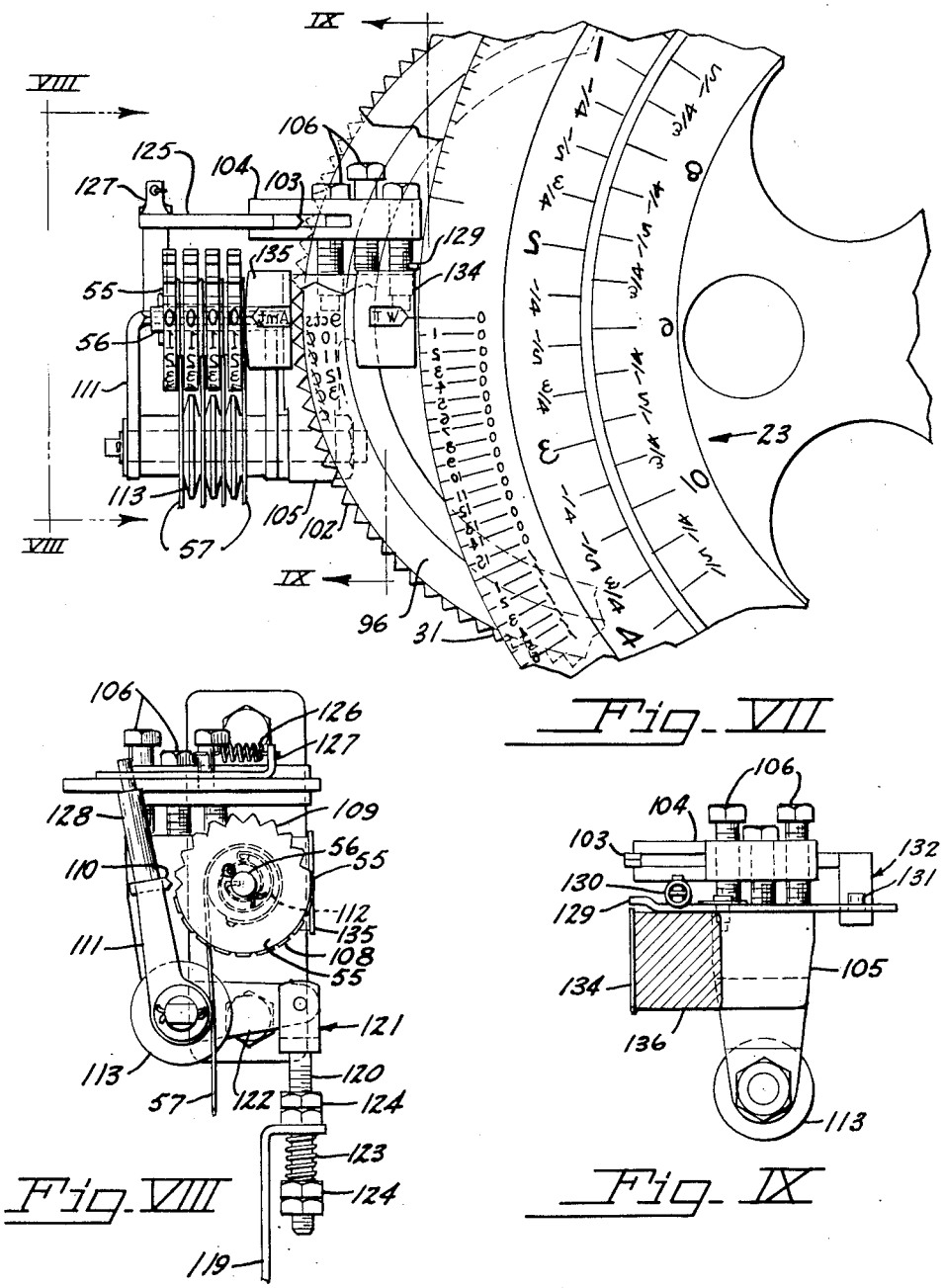

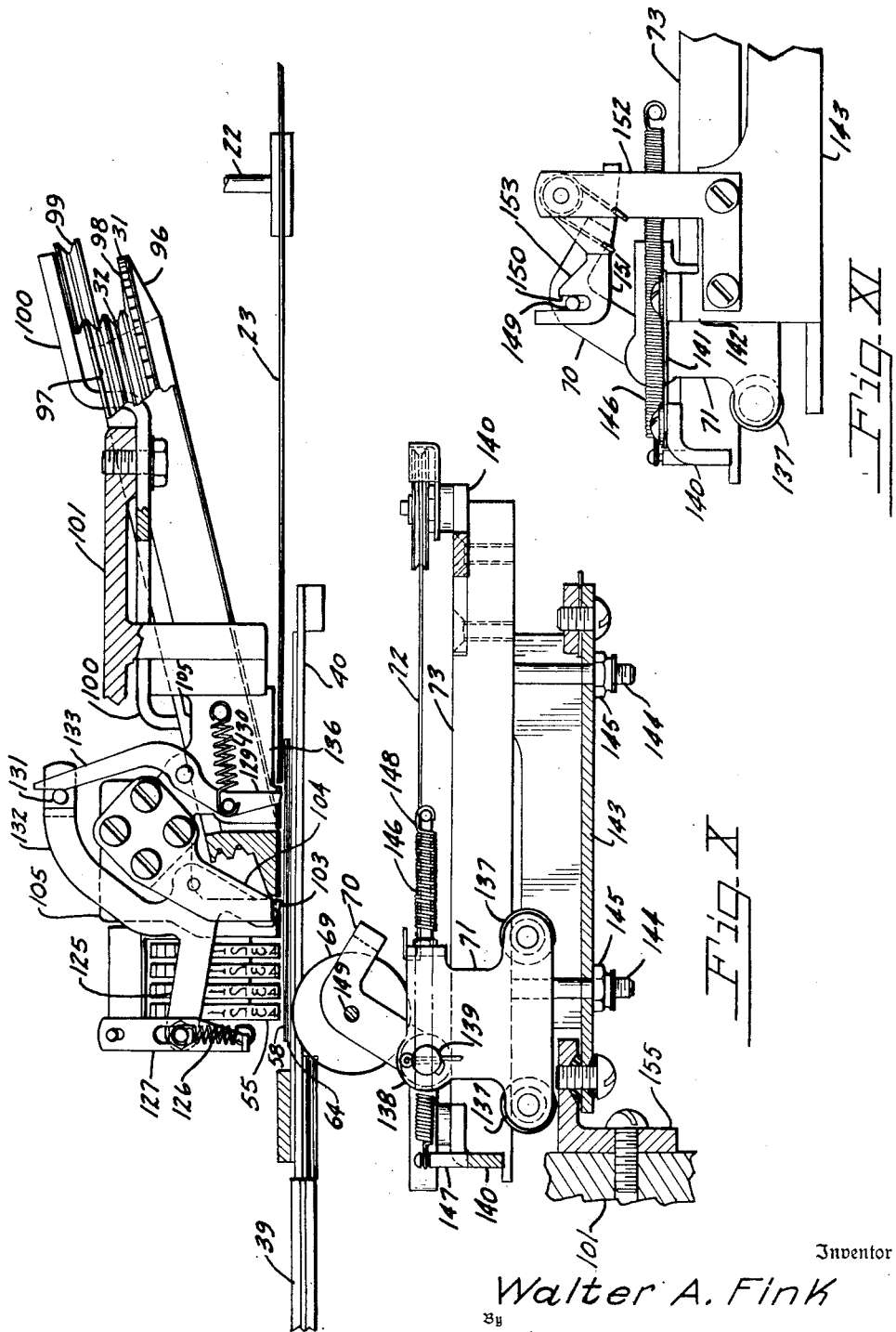

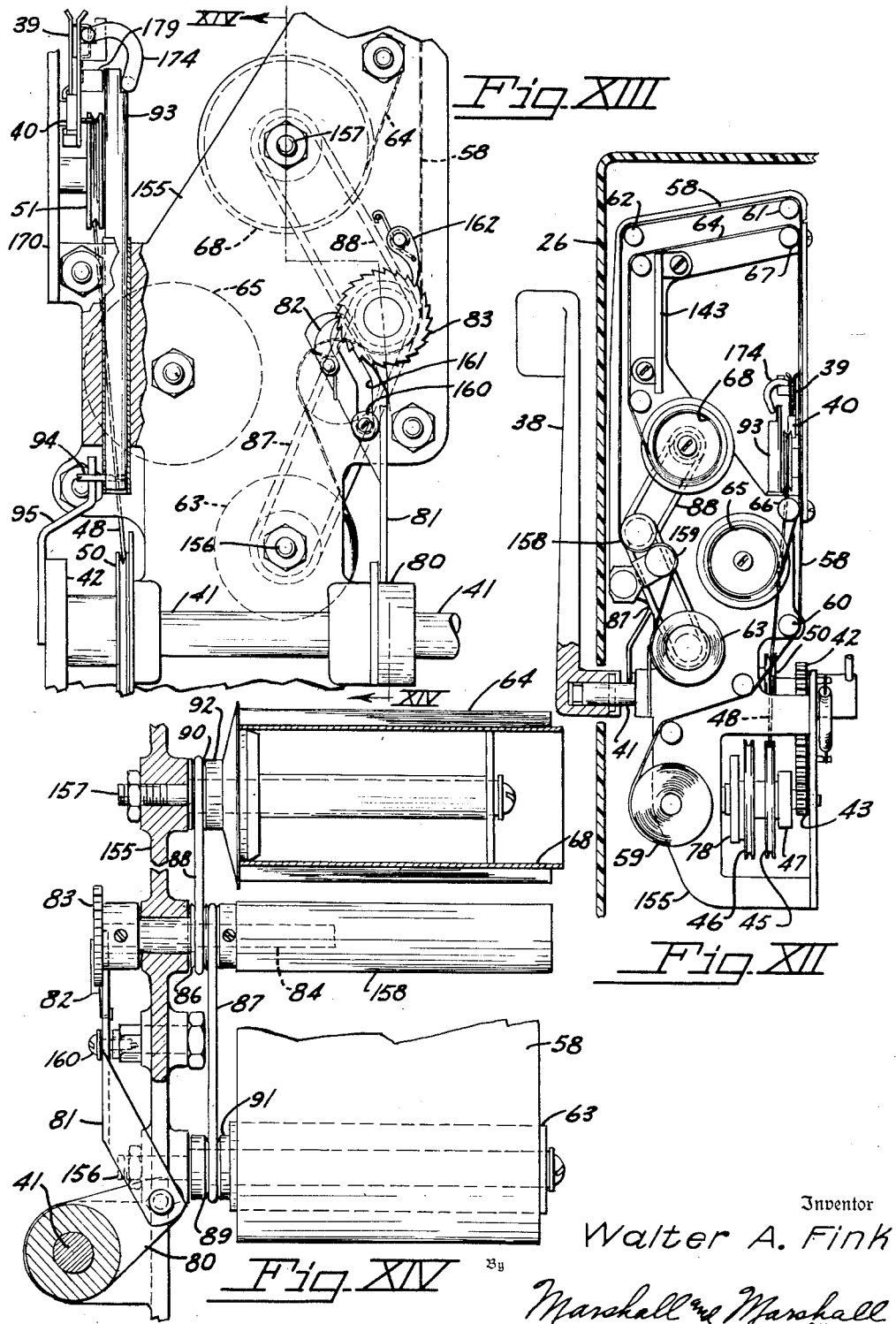

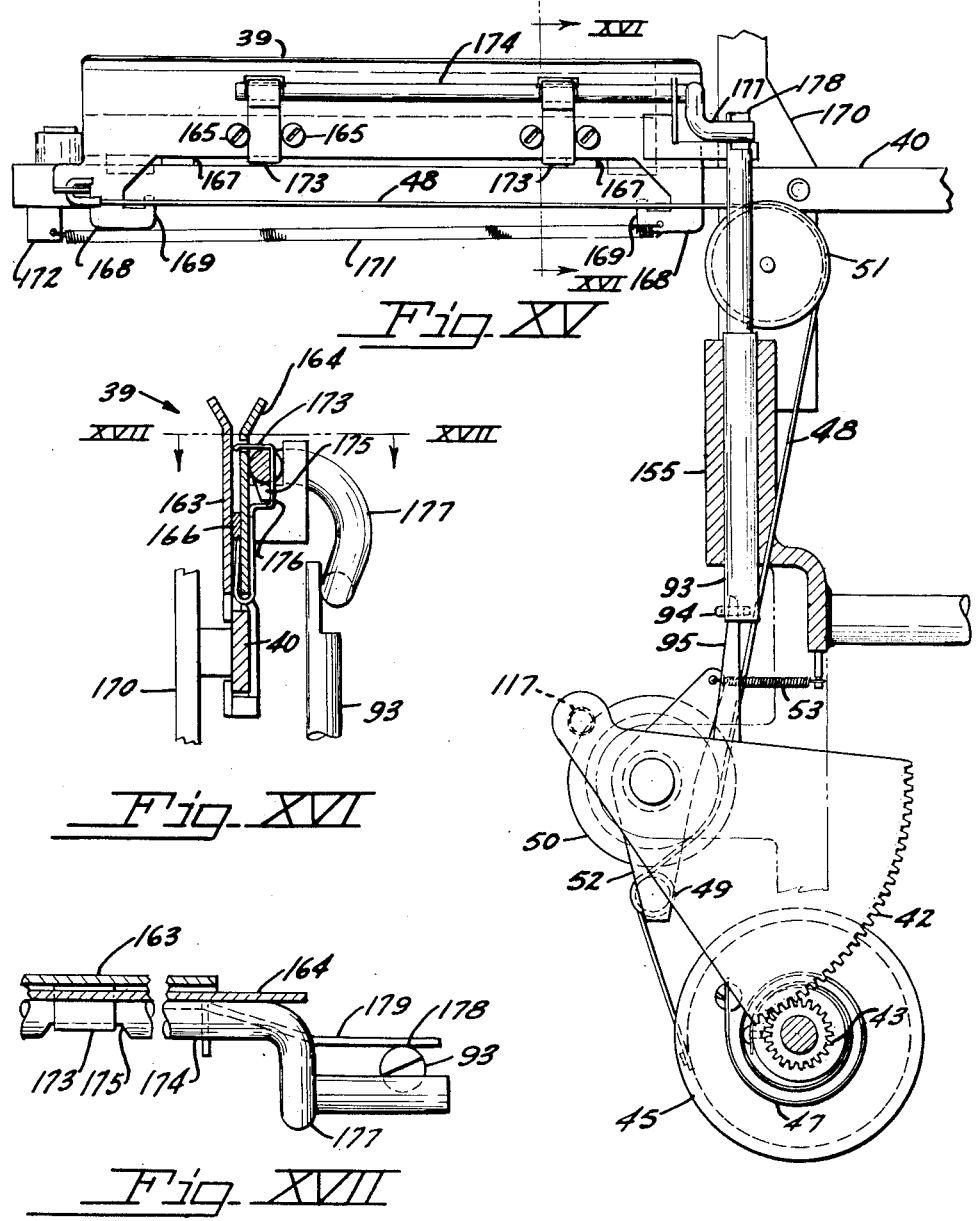

United States Patent Office 2,793,849
Patented May 28, 1957

2,793,849

WEIGHING SCALES

Walter A. Fink, Toledo, Ohio, assignor to Toledo Scale Company, Toledo, Ohio, a corporation of New Jersey Application September 23, 1950, Serial No. 186,433

6 Claims. (Cl. 265—5)

This invention relates to weighing scales that are used in retail food stores and more particularly to a weighing scale that is equipped to print a ticket showing the weight of the commodity on the scale, the price per unit of weight of such commodity and the computed value or total cost of the commodity being weighed.

It has often been proposed that weighing scales for retail food stores be equipped to compute automatically the value of the commodity and print a ticket showing the weight, price and value of the commodity. While the need for such a scale has been well recognized no one has devised a commercially acceptable weighing scale equipped to print the weight, price and value of the commodity. The previously proposed devices have either been inaccurate or too expensive to the prospective users of the scales to compete with computed value scales—scales that display on a chart the weight of the commodity and the value as computed at a number of selected prices.

The principal object of this invention is to provide a computed value weighing scale with printing mechanism having juxtaposed weight printing type and value printing type. The weight type being positioned by the scale mechanism and the value type being on members settable by an operator in accordance with computed values automatically displayed to the operator upon operation of the scale mechanism.

Another object of the invention is to provide a computed value weighing scale with printing mechanism and a movable viewing device that is positionable according to the price of the commodity and which viewing device is operatively connected to a price printing member arranged to position price printing type in juxtaposition to weight printing type and value printing type.

A still further object of the invention is to provide a computed value weighing scale with automatically positioned weight printing type and a manually operable key board that is operatively connected to value printing members whereby an operator may position the value printing members in accordance with computed value indicia displayed by the scale mechanism, so that the weight and the computed value will be printed together.

A still further object of the invention is to accomplish the printing of weight, price and value indications with a minimum of equipment and in an inexpensive practical manner.

Further objects and advantages are apparent from the following description of a weighing scale constructed according to the invention.

According to the invention a weighing scale, having means for displaying to an operator value indicia corresponding to the weight of the commodity on the scale computed at a selected price, is provided with a weight printing chart operable by the scale mechanism and a value printing mechanism that is positionable by the operator in accordance with the observed computed value indicia. In addition, as an auxiliary feature, a movable viewing device, settable according to the price of the commodity, is arranged to direct the operator's attention to the selected column of value indicia and simultaneously position a price printing member in order that the price of the commodity will be printed on a ticket simultaneously with the weight and the computed value.

A weighing scale constructed according to the invention provides a printed ticket upon which the weight, price and value of the commodity appear without requiring or employing any multiplying mechanism or variable ratio device such as ordinarily is required in printing calculating apparatus. In lieu of calculating mechanism, which cannot be adapted for use on a scale without providing intermediate driving mechanism and which calculating mechanism is complicated and expensive, a simple key board is provided to position the value printing members. The automatic weight type positioning mechanism, the automatically operated price printing mechanism and the key operated value type positioning mechanism are so constructed and coordinated that the operator, upon noting the value of the commodity from the chart moved by the scale, can enter such value on the key board and print the weight-price-value ticket thereby obtaining a permanent record of the transaction.

A preferred embodiment of the invention is illustrated in the accompanying drawings.

In the drawings:

Figure I is an end elevational view of a weighing scale as seen from the right end of the scale.

Figure II is a plan view of the improved scale.

Figure III is a front elevational view of the upper portion of the scale showing the computed value chart and a portion of a viewing device that cooperates with the chart.

Figure IV is a schematic diagram of the driving mechanism for positioning a viewing device to cooperate with a column of computed value indicia corresponding to a selected price.

Figure V is a schematic diagram of the printing mechanism for the improved scale showing the cooperation of a weight printing member, a value printing member, a price printing member, and means for positioning a ticket, an inked ribbon, and a record strip in printing position.

Figure VI is an end view of the scale with the paper and ribbon feeding mechanism removed to show the relative positioning of the various printing members.

Figure VII is an enlarged fragmentary sectional view of the printing portions of the various positionable members.

Figure VIII is an end elevational view of the value printing members as seen from the line VIII—VIII of Figure VII.

Figure IX is a fragmentary elevational view as seen from the line IX—IX to show the adjustment of the aligning members that place the printing members in accurate final alignment.

Figure X is a generally horizontal sectional view of the printing mechanism of the improved scale.

Figure XI is a fragmentary detail of a portion of the printing mechanism as seen from a plane next above the section represented by Figure IX.

Figure XII is a rear view in the nature of an elevation of the paper and ribbon feeding mechanism with the printing mechanism itself omitted.

Figure XIII is a fragmentary view in the nature of an elevation showing the drive mechanism for the paper and inked ribbon.

Figure XIV is a view in section taken substantially along the line XIV—XIV of Figure XIII.

Figure XV is a fragmentary detail of the ticket positioning members and the drive therefore as separated from the remainder of the mechanism.

Figure XVI is a view in section taken substantially along the line XVI—XVI of Figure XV.

Figure XVII is a fragmentary sectional view taken substantially along the line XVII—XVII of Figure XVI.

These specific figures and the accompanying drawings are intended merely to illustrate the invention but not to impose limitations on its scope.

A weighing scale equipped to print weight, price and value tickets according to the invention comprises a base 1 in which is mounted a lever system (not shown) to support a load receiver 2 in the nature of a platter or other commodity receiver. Conventional load counterbalancing mechanism, erected from the base 1, is operatively connected to the lever system supporting the load receiver 2 and is drivingly connected to a chart 3 (Figures II and III). The chart 3 has a plurality of columns 4 of indicia representing the value or cost of a commodity on the load receiver 2 computed according to various prices, there being one column for each price. The value indicia are displayed to an operator through a viewing device 5 (Figure II) slidably mounted within a tiltable housing 6 pivotally mounted on the upward forward portion of a scale housing 7 erected from the base 1. A price chart 8, mounted within the tiltable housing 6, cooperates with an index 9 on the viewing device 5 to identify that one of the columns 4 of value indicia that is located behind an opening 10 of the viewing device 5. The viewing device 5 is traversed along the chart 3 by manipulation of a hand wheel 11 carried on a shaft 12 extending from the end of the tiltable housing 6.

Referring to Figure IV the drive from the hand wheel 11 to the viewing device 5 includes a pair of bevel gears 13 and a pair of spur gears 14 that transmit power to a sprocket 15 driving a ladder chain 16 attached to the viewing device 5. The chain 16 is also carried over a sprocket 17 at the other end of the housing 6. The sprockets 15 and 17 drive spools 18 and 19 upon which curtains 20 and 21 are rolled. The curtains extend from the viewing device 5 and serve to conceal those portions of the chart 3 that are not hidden by the viewing device 5.

Referring to Figure II the chart 3 is carried on a chart shaft 22 which shaft also carries a disk chart 23 provided with weight indicia. Images of the weight indicia on the chart 23 as reflected by a mirror 24 are visible from the customer's side of the scale through a window 25 formed in a housing 26 covering the right end of the scale. Images of other weight graduations, as formed by a second mirror 27, are visible from the operator's side of the scale through a second window 28. Masks 29 and 30 restrict the view of the graduations seen in the mirrors 24 and 27 to the appropriate portions of the chart 23.

The disk chart 23 also carries raised weight printing graduations and type around its periphery and positions such weight printing graduations and type in proper printing position according to the load on the scale.

A price printing ring 31 carrying price printing type is operatively connected through a cord drive 32, trained over a plurality of pulleys 33, to the viewing device 5 so that the price printing ring 31 is automatically positioned as the viewing device 5 is moved to a position corresponding to the selected price.

A key board mechanism 34 having a plurality of keys 35 is mounted from the base 1 laterally adjacent the load receiver 2 and forward of the lower portion of the housing 26. The key board mechanism 34 is operatively connected to value printing type members so that an operator, having placed a commodity on the load receiver 2 and positioned the viewing device 5 according to the commodity price, may observe the computed value of the commodity displayed in the viewing device 5 and enter such value amount on the key board 34. Then, having placed a ticket 36 in a ticket guide 37, the operator pushes a handle 38 that is connected through mechanism to move the ticket 36 into printing position and to print thereon the value of the commodity as entered on the key board 34, the price as indicated by the position of the viewing device 5 and the weight of the commodity as indicated by the position of the disk chart 23.

Referring now to Figure V, the mechanism for placing the ticket in printing position and printing the ticket includes a shuttle 39 which runs on a track 40 one end of which track is located within the ticket guide 37. The shuttle 39 is driven by a chain of mechanism including the handle 38, carried on a shaft 41 which is pushed forward to rotate the shaft 41 and with it a sector gear 42 meshing with a pinion 43 carried on a shaft 44. The shaft 44 carries a pair of cable take-up pulleys 45 and 46 each of which is loose on the shaft. The take-up pulley 45 is driven from the shaft 44 by a yieldable connection comprising a spiral spring 47 and a preload stop (not shown in the drawing) that serves to preload the spring 47 so that the take-up pulley 45 turns with the shaft 44 as long as the force transmitted therebetween is less than the preload force of the spring. As the motion of the take-up pulley 45 is arrested at the end of the shuttle stroke the spring permits the shaft 44 to continue to turn. A shuttle drive cable 48 fastened to the cable pulley 45 is trained over a slack take-up pulley 49, a guide pulley 50 loosely mounted on the shaft 41, and a pulley 51 mounted adjacent the track 40. From the pulley 51 the cable 48 follows along the track 40 and is attached to the shuttle 39. The slack take-up pulley 49 is carried in a yoke 52 which, is urged by a light helical spring 53, turns in a direction to increase the wrap of the cable 48 around the guide pulley 50.

Rotation of the sector gears and shafts first takes up the slack in the cable 48 and then drives the shuttle 39 along the track 40 to carry the ticket into printing position.

Fragments of the weight printing disk or chart 23 and the price printing ring 31 are shown in the upper portion of the Figure V. An outline of the printing area of the ticket is indicated by dot and dash lines 54. A plurality of value printing type bearing drums 55 carried on a shaft 56 are located adjacent the price ring 31 and are operatively connected through cables 57 to the key board 34. As arranged, the weight chart 23, the price ring 31 and the value type bearing drums 55 present juxtaposed printing type at the printing area.

In addition to the tickets that are carried into printing position by the shuttle 39, impressions are also taken on a record strip 58 that is drawn from a supply roll 59 over guides 60, 61 and 62 and wound on a take-up roll 63.

Ink for the printing is provided by a wide inked ribbon 64 that, feeding from a supply roll 65, is carried over guides 66 and 67 along the path of the record strip 58 and that is wound on a take-up roll 68. At the printing area the record strip 58 is next to the printing type, the inked ribbon 64 is next and a ticket 36 in the shuttle 39 is next in order. The impressions are taken by pressure applied to the ticket, ribbon and strip by a roller 69 mounted on toggle arms 70 of a carriage 71 mounted on a track 72. The carriage 71 is driven by a roller drive cable 73 which, extending from the carriage 71 along the track 72, passes a first pulley 74, a second pulley 75 and is wound on the cable drive pulley 46. This drive pulley 46 is idle during most of the first revolution of the shaft 44 and moves when a drive member 76 carried on the shaft 44 engages a pin 77 extending from the side of the cable drive pulley 46. A preloaded spiral spring 78 connecting the shaft 44 to the drive member 76 transmits the force from the shaft 44 and is strong enough to drive the carriage 71 against the normal resistance of the printing roller 69 without yield but which nevertheless yields when the carriage 71 reaches a stop the end of its travel.

The toggle arms 70 are illustrated in Figure X in nonprinting position with the roller 69 held near the carriage 71 by a light spring 79. Mechanism shown in Figure XI serves to straighten the toggle arms 70 during the initial movement of the carriage 71 so that the roller 69 is in printing position during its forward movement across the ticket. At the start of the return stroke the toggle arms 70 pivot on the carriage 71 so that the carriage and roller 69 return free of the ticket thus avoiding double impressions.

The timing of the drive mechanism is such that the initial movement of the handle 38, transmitted through the gears 42 and 43 and the shaft 44 first takes up the slack in the shuttle drive cable 48, then drives the shuttle 48 forward to bring the ticket into printing position, then, driving through the cable 73, moves the roller carriage and roller 69 forward to press the ticket, ribbon and record strip against the type bearing members to take the impression or record of the weight, price and value of the load on the scale.

As the hand operated lever 38 returns to its normal position it operates, through a crank arm 80 and link 81, a ratchet click 82 to advance a ratchet wheel 83 at least one step. The ratchet wheel is on a shaft 84 which also carries belt pulleys 85 and 86 that are connected through belts 87 and 88 respectively to pulleys 89 and 90 carried on shafts or sleeves 91 and 92. The record strip take-up roll 63 and the inked ribbon take-up spool 68 are carried on the shafts 91 and 92 respectively so that the record strip 58 and the inked ribbon 64 are advanced a short distance for each printing operation.

The initial movement of the handle 38, during which time the slack is taken up in the shuttle drive cable 48, provides for the operation of a ticket clamp included in the shuttle 39 and shown in Figure XV. The clamp is released when the shuttle is in ticket receiving position by rotation of a release shaft 93, a pin 94 of which is engaged by an arm 95 of the sector gear 42 as the gear returns to its rest position.

Figures VI to XI inclusive show the type carrying mechanism and the printing mechanism cooperating therewith. As is outlined in Figure VI and shown in section in Figure X the price printing ring 31 is formed with a beveled face 96 carrying raised price printing type and, behind that face and at a smaller diameter, a pair of peripheral grooves 97 and 98 that receive the drive cord 32 connected to the viewing device 5. The price printing ring 31 is supported on a plurality of grooved rollers 99 carried on arms of a bracket 100 attached to an end frame 101 of the weighing scale mechanism. The grooved rollers 99 engage a shoulder of the peripheral grooves 97 of the ring 31 and, being equally spaced around its periphery, hold the ring 31 in position while permitting it to rotate according to the movement of the viewing device 5. The price printing ring 31 is located generally behind in overlapping relation to the edge of the weight chart 23 and at an angle to the plane of the chart 23 so that a portion of its beveled face projecting radially beyond the chart 23 is coplanar with the chart. This makes it possible to obtain juxtaposed printing type for price and weight in a very small space.

The periphery of the price printing ring 31 has a plurality of notches 102, one for each price to be printed, which cooperate with a centering finger 103 pivotally mounted in a holder 104 which in turn is adjustably mounted on a bracket 105 attached to or forming part of the end of the end frame 101 of the scale. A plurality of bolts 106 some of which are tapped into the holder 104 and some of which are tapped into the bracket 105 support the holder 104 and permit it to be adjusted with respect to the bracket 105 in order to properly align the price indicia in printing position.

Each of the value printing drums 55, which are mounted on the shaft 56 projecting from the bracket 105, has a series of raised printing type 108 (Figure VIII) disposed along half the periphery of the drum and a plurality of notches 109 disposed along the other half of its periphery.

A centering bar 110 carried on a U-shaped arm 111 cooperates with the notches 109 to align the value printing type during a printing operation.

Each of the value printing drums 55 includes a spiral spring 112 urging the drum in a direction to stretch its positioning cable 57. As may be seen in Figures VI and VIII, each of the cables 57 is wrapped on a shoulder on a side face of the associated drum 55 and extends over half way around, so that, by pulling on the connected cable 57, the drum may be rotated at least a half of a revolution.

From the drums 55 the cables 57 are led over guides 113 on the bracket 105, over pulleys 114 on the end frame 101, over a second set of pulleys 115 mounted beneath the key board 34, and are attached to arms 116 extending downwardly from the key board 34. The arms 116 are operatively connected to the keys 35 so that depression of a key positions the corresponding arm 116 at a definite and related position. As the arm 116 moves it pulls the connected one of the cables 57 a corresponding distance so that the attached value printing drum 55 is positioned to print a number corresponding to the actuated one of the keys 35.

Normally the centering finger 103 for the price printing ring 31 and the centering bar 110 for the value printing drums 55 are in inoperative position. During the first portion of the stroke of the manually operated handle 38, a roller 117 mounted on the sector gear 42 contacts and operates a lever 118 pivotally mounted on the end frame 101. The other end of the lever is connected through a link 119 to a stud 120 of a stirrup 121. The stirrup 121 in turn is connected to a laterally directed portion 122 of the U-shaped arm 111 carrying the centering bar 110. The connection between the link 119 and the stud 120 includes a helical compression spring 123 and lock nuts 124 threaded on the stud 120 so that the lever 118 and link 119 may overtravel without damaging the value printing drums 55.

The price ring centering finger 103 includes an arm 125 which is connected through a spring 126 and slide link 127 to an extension 128 of the centering bar arm 111, so that the finger 103 is driven into centering position at the same time that the centering bar 110 engages the notches 109 of the value printing drums 55. The parts are proportioned so that the centering finger 103 is firmly seated in one of the corresponding notches 102 in the periphery of the price ring 31 and so that the spring 126 is slightly extended before the centering bar 110 is seated in the notches of and has centered the value printing drums 55.

In order that the operation of the printing mechanism shall not disturb the indication of weight, a brake 129 pivoted on the bracket 105 is arranged to engage the edge of the disk chart 23 at the same time that the centering finger 103 and the centering bar 110 move into centering position. The brake 129 is urged by a tension spring 130 into braking position and is normally held out of braking engagement by a pin 131 mounted on a third leg 132 of the centering finger 103 in position to engage a tail end 133 of the brake 129. As soon as the centering members move in response to movement of the operating handle 38 the brake 129 is applied to the rim of the chart 23 and the price ring 31 and the value printing drums 55 are locked in printing position.

Raised portions 134 and 135 of the bracket 105 in the plane of the type bearing faces of the chart 23, price ring 31 and value drums 55 carry raised indicia and index marks to print legends designating the amount impressions, the weight impression and an index against which the printed weight graduations are read. Another portion 136 of the bracket 105 extends directly behind the disk chart 23 and serves as a back-stop for the chart during a printing operation. The chart is installed so that it is close to but not in rubbing contact with the back-stop and is made of sufficiently flexible material that it easily yields to the printing pressure until it is supported by the back-stop portion 136.

As was described earlier the impressions are taken by running the roller 69 over the superimposed ticket, inked ribbon, and record strip to force these against the type bearing members. As may be seen in Figure X, the roller 69 is carried on the L-shaped arms 70 which in turn are pivotally mounted on the carriage 71. The carriage 71 is provided with a plurality of flanged rollers 137 arranged to run on the corners of the rectangularly cross sectioned bar forming the track 72. An anti-friction bearing 138, such as a needle bearing, is carried on a shaft 139 (which also carries the L-shaped toggle arms 70) and runs on the face of the track 72 to support the roller 69 against the printing pressure without introducing friction.

The ends of the track 72 are provided with T-shaped extensions 140 and these extensions in turn are connected through flat springs 141 to sides 142 of a generally U-shaped support frame 143. The springs 141 are tensioned so that the track 72 is urged toward the printing indicia bearing members and the movement of the track in that direction is limited by a pair of studs 144 which, being set into the track 72 and extending through the frame 143, carrying lock nuts 145 that engage the frame 143 to control the position of the track 72.

A tension spring 146 connected between a pin 147 on one of the T-shaped end pieces 140 and an extension 148 of the carriage 71 pulls the carriage 71 to its retracted position as shown in Figure X. During a printing operation, when tension is applied to the roller drive cable 73, the carriage 71 moves along the track 72 thus extending the tension spring 146.

In order to straighten up the toggle arms 70 at the start of a printing stroke, an axle 149 carrying the roller 69 is extended through the arms 70 and engages a notch 150 of a catch 151 pivotally mounted from an arm 152 of the support frame 143. As the carriage 71 moves forward the roller axle 149 is retained by the catch 151 until the roller 69 is in printing position and the axle 149 clears the notch 150. As long as the carriage 71 is moving forwardly the printing pressure between the indicia and the roller and the force to overcome the resiliency of the ticket and inked ribbon hold the roller in its extended position, i. e., in position to apply pressure to the ticket and strip. When the carriage starts its return, the roller 69 stops at its furtherest advance and, by pivoting the arms 70 on the shaft 139, takes the position shown in Figure X thus avoiding any pressure on the ticket during the return stroke which, if there were movement of the ticket, would result in a double impression. Near the end of the return stroke the roller axle 149 engages a sloping portion 153 of the catch 151 and depresses the catch against the force of a spring 154 until the end of the axle 149 enters the notch 150 of the catch 151.

By using a roller of fairly small diameter to apply the pressure successively to incremental areas of the ticket it is possible to concentrate the available force so that the entire printing operation may be accomplished with little force. Thus a five pound force applied by the roller 69 produces as satisfactory a print or impression as would several hundred pounds applied by a platen extending the full length of the ticket.

Figures XII to XIV inclusive illustrate the mechanism for feeding and guiding the record strip 58 and the inked ribbon 64. This mechanism is carried on a base plate or frame 155 that is mounted from and which extends perpendicular to the end frame 101 of the scale. This base plate or frame 155 carries bearings for the drive shafts 41 and 44 as well as the ratchet driven shaft 84. As shown in these figures the paper take-up spool or roll 63 and the inked ribbon take-up roll 68 are freely rotatable on studs 156 and 157 respectively. While Figure V showed these take-up rollers as carried on shafts 91 and 92, the shafts 91 and 92 are actually sleeves that are journaled on the studs (see Figure XIV).

The course of the record strip 68 may be easily followed in Figure XII from the supply roll 59, over the guides, and up along the right side of the figure. This upward course of the strip 58 is face to face with the printing portions of the weight chart 23, the price ring 31 and the value indicia drums 55. From the printing area the strip moves over guides at the top of the frame, down the other side of the frame, over a rubber faced drive roll 158, around a pressure roll 159 and then onto the take-up spool 63. The pressure roll 159 is spring urged into contact with the drive roll 158 to pinch the record strip therebetween. The drive roll 158 is carried on the ratchet driven shaft 84 so that it turns a fixed amount for each printing operation thus spacing the impressions uniformly along the length of the strip. The take-up spool 63, however, is driven by the belt 87 (preferably a spring belt) which stretches and slips to maintain a generally constant tension on the record strip 58 as it winds on the spool.

The inked ribbon 64 is arranged to follow substantially the same path as the record strip 58 except that it is wound directly upon the take-up spool 68 without any provision made for a constant feed per printing cycle. The only feeding requirement as far as the inked ribbon is concerned is that it be moved a small distance for each printing but the amount need not be constant nor measured. Therefore a plain belt drive such as the belt 88 is entirely adequate. The roller printing mechanism is not shown in Figure XII but actually extends through an open space left in the frame 155 opposite the printing position of the printing type carried on the chart 23, price ring 31 and the value drums 55. This space also accommodates the shuttle 39 as it carries a ticket into printing position.

Figures XIII and XIV show various details of the drive mechanism for the second strip take-up roll 63 and ribbon take-up spool 68. Thus Figure XIII shows in detail the links 81 which is guided by a pin 160 extending through a slot 161 in the link so that the click 82 mounted on the end of the link 81 may engage and drive the ratchet wheel 83 during the return stroke of the handle 38. A second click 162 mounted on the frame 155 prevents any back movement of the ratchet wheel 83 during the forward motion of the handle 38 when the click 82 is moving forward to engage the next tooth of the wheel 83.

The shuttle mechanism for carrying the ticket into printing position and returning it to an exposed position is illustrated in Figures XV, XVI and XVII. As shown in these figures the shuttle 39 comprises a back plate 163 and a front plate 164. The back plate 163 is extended down so that it slightly overlaps one edge of the track 40. The front plate 164, which is secured to and spaced from the back plate 163 by a plurality of screws 165 and a spacer 166, has a pair of depending lugs 167 adapted to ride on the upper surface of the track 40 and a pair of legs 168 extending downwardly along the side of the track 40 and fitted with tips 169 that, passing beneath the track 40, engage its back surface so that the combination of the lower portion of the back plate 163 and the legs 168 with the tips 169 nearly surround the track 40. The track 40 is mounted on a support member 170 (see also Figure XIII). Since the track 40 is in the form of a fairly wide strip, this construction, with a small amount of clearance, allows the shuttle 39 to travel freely along the track 40 without interfering with or catching on other structure located along its path.

As was mentioned previously, the shuttle 39 is driven forwardly by the shuttle cable 48. It is returned to the position shown in Figure XV, its ticket receiving position, by a helical tension spring 171 connected between a downwardly projecting finger 172 of the track 40 and the forward one of the shuttle legs 168. The upper edges of the shuttle back plate 163 and shuttle front plate 164 are flared outwardly to form an entrance guide for directing the edge of a ticket into the shuttle as the ticket is inserted through the stationary guide 37. The ticket is clamped or locked in place by a pair of spring fingers 173 that are mounted in the front plate 164 and that press the ticket against the back plate 163. When the shuttle 39 is in its ticket receiving position the spring fingers 173 are retracted by a finger control shaft 174 having a coined flat and projecting rib 175 engaged behind a loop portion 176 of each spring 173. The forward end of the control shaft 174 is bent to form a goose necked section 177 the end of which extends along a line parallel to the remainder of the control shaft 174 but displaced laterally and downwardly therefrom. The relationship between the end of the goosed end section 177 and the coined ribs is such that movement of the goosed necked end 177 away from the shuttle causes the ribs 175 to release the pressure of the springs 173 on the ticket.

The upper end of the ticket lock release shaft 93 is cut away leaving a narrow, marginal, upstanding section 178 which, when the shuttle 39 is in the ticket receiving position, is interposed between the goose necked section 177 of the control shaft 174 and a brace 179 extending from the shuttle front plate 164. At the end of the stroke of the operating handle 38, when the sector gear arm 95 strikes the pin 94, the lock release shaft 93 is rotated and the narrow marginal section 178, which before rotation loosely entered the space between the end 177 and the brace 179, in turning, forces the goose necked section 177 away from the shuttle 39 to release the ticket grasping spring fingers 173. These fingers are held out of grasping position until the start of the next printing cycle when the lock shaft 93 is released and the fingers 173 spring into grasp the ticket just before the shuttle moves toward the printing area.

The structure just described provides a simple means for printing a ticket to record the weight of a commodity on the scale, the price at which the commodity is to be sold and the value or cost of the commodity as computed according to the weight and selected price. The weighing scale itself provides weight printing graduations and type as well as a chart on which are displayed money values computed according to a series of prices and the weight of the load. A viewing device positionable according to the selected price displays the computed money values and is operatively connected to a price printing ring, the ring 31, so that the simple operation of positioning the viewing device to read the computed value also sets up price printing type in printing position.

The described structure also provides means whereby the operator, after having observed the displayed computed value, may easily and quickly position value printing mechanism according to the observed value and then print in juxtaposed position on a ticket the weight, the price, and the value of the commodity.

Various modifications in the specific details of construction and the addition of various auxiliary mechanism may be made to further facilitate the operation of the device.

I claim:

1. In a weighing scale of the class described, in combination, a weighing mechanism, a chart driven by the weighing mechanism and bearing indicia corresponding to the money value of a commodity on the scale computed at each of a series of different prices, display mechanism movable to a position corresponding to a selected price for displaying to an operator the value indicia corresponding to the money value of the commodity computed at the selected price, a weight printing member operatively connected to the weighing mechanism, a price printing member operatively connected to said movable display mechanism, money value printing members, selecting mechanism manipulative by the operator for positioning the money value printing members according to the displayed computed money value, means for positioning an element to be printed, and mechanism for making juxtaposed impressions upon said element from the weight, price, and money value printing members.

2. In a weighing scale of the class described, in combination, a weighing mechanism, a chart driven by the weighing mechanism, said chart having indicia corresponding to the money value of a commodity on the scale computed at each of a series of selected prices, means for displaying to an operator the value indicia corresponding to a selected one of said series of prices, a weight printing member operatively connected to the weighing mechanism, a price printing member operatively connected to the display means and juxtaposed to the weight printing member, money value printing members juxtaposed to the weight and price printing members, means operable by the operator for positioning the money value printing members in accordance with the displayed commodity value means for positioning an element to be printed, and means for making an impression upon said element from said juxtaposed printing members.

3. In a weighing scale of the class described, in combination, an automatic weighing mechanism, a cylindrical chart operatively connected to the weighing mechanism, said chart having a plurality of columns of value indicia for displaying to an operator value indicia corresponding to the money value of a commodity on the scale, a shaft carrying the chart, a disk mounted on the shaft, said disk having printing type corresponding to the weight of the commodity, money value printing members mounted adjacent the disk, manually operated positioning mechanism connected to the value printing members whereby the operator may position the members according to the displayed value means for positioning an element to be printed, and mechanism for making an impression upon said element from the weight and money value printing members.

4. In a weighing scale of the class described, in combination, an automatic weighing mechanism, a cylindrical chart operatively connected to the weighing mechanism, said cylindrical chart having value indicia for displaying to an operator indicia corresponding to the money value of a commodity on the scale computed according to each of a series of selected prices, a disk chart operatively connected to the weighing mechanism, said disk chart having printing graduations and type along its periphery, money value printing members mounted adjacent said disk chart, manipulative selecting mechanism operatively connected to the money value printing members whereby the operator may position the money value printing members in accordance with the displayed value indicia means for positioning an element to be printed, and mechanism for making juxtaposed impressions upon said element from the weight and money value printing members.

5. In a weighing scale of the class described, in combination, an automatic weighing mechanism, a chart shaft operatively connected to the weighing mechanism, a cylindrical chart on the shaft, said cylindrical chart having indicia for displaying to an operator the money value of the commodity on the scale as computed according to each of a series of selected prices, a disk chart mounted on the chart shaft, said disk chart having raised graduations along its edge and weight printing type adjacent the graduations, money value printing members mounted adjacent the disk chart, a key board operatively connected to the money value printing members whereby the operator may position the members in accordance with the displayed value indicia means for positioning an element to be printed, and mechanism for making an impression upon the weight element from the weight printing graduations and type in juxtaposition to an impression upon said element from the money value printing members.

6. In a weighing scale of the class described, in combination, an automatic weighing mechanism, a chart operatively connected to the weighing mechanism, said chart having columns of indicia representing the cost of a commodity on the scale computed at various prices, a positionable viewing mechanism movable along the chart for displaying to an operator indicia on the chart corresponding to the cost of the commodity computed according to a price at which the mechanism is set, a disk chart operatively connected to the weighing mechanism, said disk chart having printing graduations and type around its periphery, a member mounted adjacent the disk chart and operatively connected to the viewing mechanism, price printing type on said member corresponding to the prices at which the viewing mechanism may be positioned, money value printing type bearing members mounted adjacent the disk chart, a manually operable key board operatively connected to the value printing members means for positioning an element to be printed, and means for making juxtaposed impressions upon said element from said price and money value printing type and weight graduations.

References Cited in the file of this patent

UNITED STATES PATENTS

| | | |
|---|---|---|
| 1,189,196 | Emanuel | June 27, 1916 |
| 1,335,070 | Malcher | Mar. 30, 1920 |
| 1,347,572 | Bergen | July 27, 1920 |
| 1,550,735 | Ogsbury | Aug. 25, 1925 |
| 1,749,192 | Osgood | Mar. 4, 1930 |
| 2,036,538 | Pearson | Apr. 7, 1936 |
| 2,544,038 | Nicaise | Mar. 6, 1951 |

FOREIGN PATENTS

| | | |
|---|---|---|
| 220,503 | Great Britain | Aug. 21, 1924 |
| 412,439 | Great Britain | June 28, 1934 |